United States Patent
Ooi et al.

(10) Patent No.: US 7,769,299 B2
(45) Date of Patent: Aug. 3, 2010

(54) CHROMATIC DISPERSION MONITORING METHOD AND CHROMATIC DISPERSION MONITORING APPARATUS, AND OPTICAL TRANSMISSION SYSTEM

(75) Inventors: Hiroki Ooi, Kawasaki (JP); Akira Miura, Kawasaki (JP); Hiroshi Onaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 716 days.

(21) Appl. No.: 11/475,046

(22) Filed: Jun. 27, 2006

(65) Prior Publication Data

US 2007/0177876 A1    Aug. 2, 2007

(30) Foreign Application Priority Data

Jan. 31, 2006    (JP) ............................. 2006-023742

(51) Int. Cl.
*H04B 10/12*    (2006.01)
*H04B 10/00*    (2006.01)

(52) U.S. Cl. .......................... 398/147; 398/81; 398/159

(58) Field of Classification Search ................... 398/81, 398/147, 148, 159; 359/337.5, 339
See application file for complete search history.

(56) References Cited

U.S. PATENT DOCUMENTS 7,394,993 B2 *   7/2008   Sekiya et al. ............... 398/201
7,418,211 B2 *   8/2008   Akiyama et al. ............ 398/198

2007/0140700 A1 *   6/2007   Vassilieva et al. ........... 398/147

FOREIGN PATENT DOCUMENTS

| EP | 0 902 560 | 3/1997 |
| EP | 0902560 A2 * | 3/1999 |
| EP | 0 948 151 | 10/1999 |

OTHER PUBLICATIONS

George Ishikawa, et al. "Demonstration Of Automatic Dispersion Equalization In 40 Gbit/s OTDM Transmission." ECOC'1998 paper Wdc06, pp. 519-520.
Hiroki Ooi, et al. "40-Gbit/s WDM Automatic Dispersion Compensation With Virtually Imaged Phased Array (VIPA) Variable Dispersion Compensators." IEICE Trans. Commun., Feb. 2002 vol. E85-B, No. 2 pp. 463-469.
Cechan Tian, et al. "Polarization-Independent Waveform Monitoring With Two-Photon Absorption In Si-APD In High-Speed Transmission Systems." ECOC 2005 We4.P.070.
Extended European Search Report mailed on Apr. 26, 2007 issued with respect to the corresponding European Patent Application No. 06013118.2-2415.

* cited by examiner

*Primary Examiner*—M. R. Sedighian
(74) *Attorney, Agent, or Firm*—Staas & Halsey LLP

(57) ABSTRACT

A chromatic dispersion monitoring apparatus according to the present invention comprises: a photodetector which photo-electrically converts an optical signal; a low-pass filter which limits a frequency bandwidth of the photo-electrically converted electrical signal to be within a range set according to a modulation format of the optical signal and a bit rate thereof; a DC elimination circuit which eliminates a direct current component of the bandwidth limited electrical signal; and a power detector which detects the power of the bandwidth limited electrical signal to detect the residual dispersion of the optical signal. As a result, it becomes possible to easily realize the chromatic dispersion monitoring apparatus of low cost, which is also capable to be arranged on an in-line.

13 Claims, 12 Drawing Sheets

43G RZ-DQPSK

DISPERSION MONITOR CHARACTERISTICS

DISPERSION TOLERANCE

FIG.4

43G RZ-DPSK

DISPERSION MONITOR CHARACTERISTICS

DISPERSION TOLERANCE

10G NRZ

DISPERSION MONITOR CHARACTERISTICS

DISPERSION TOLERANCE

CHROMATIC DISPERSION MONITORING METHOD AND CHROMATIC DISPERSION MONITORING APPARATUS, AND OPTICAL TRANSMISSION SYSTEM

BACKGROUND OF THE INVENTION

1. Field of the Invention

The present invention relates to a technology for monitoring the chromatic dispersion in a high-speed optical transmission system, and in particular, to a chromatic dispersion monitoring method and a chromatic dispersion monitoring apparatus, suitable for an automatic dispersion compensation system which is required for the ensuring of transmission characteristics, the cost reduction and the realization of optical network, and an optical transmission system.

2. Description of the Related Art

In recent years, demands for the introduction of next-generation 40 Gbit/s (gigabit/second) optical transmission system have been increased, and the research and development of such an optical transmission system have been made. In a 40 Gbit/s optical transmission system, the chromatic dispersion tolerance is significantly strict, and is changed due to the temperature variation. Therefore, an automatic compensation system using a variable dispersion compensator needs to be introduced. Further, also in a 10 Gbit/s system, commercialization of which is now progressed, since the preparation of a large variety of dispersion compensated fiber (DCF) according to various transmission distances causes problems in an initial cost, a delivery schedule and the like, the introduction of the automatic dispersion compensation system is required. Further, in years to come, since the realization of an optical network for switching routes during operations of optical adding/dropping, optical cross connecting and the like shall be progressed, it is predicted that the importance of automatic dispersion compensation system which switches a chromatic dispersion compensation amount in conjunction with the route switching will become higher.

In order to realize the automatic dispersion compensation system as described above, it is necessary to establish a technology for monitoring accurately and simply the residual dispersion of an optical signal. As conventional chromatic dispersion monitoring systems, there have been proposed, for example, an error monitoring system for detecting the residual dispersion based on error information (to be specific, the number of corrected errors output from an forward error-correction circuit and the like) which is detected when a main signal light is received to be processed at a reception end of an optical transmission system, and a clock monitoring system for extracting a clock signal of a frequency corresponding to a bit rate of a main signal light, to detect the residual dispersion based on the average power of the clock signal (refer to literature 1; G. Ishikawa and H. Ooi, "Demonstration of automatic dispersion equalization in 40 Gbit/s OTDM transmission", Proc. ECOC'98, paper WdC06, pp. 519-520, and literature 2; H. Ooi, T. Takahara, G. Ishikawa, S. Wakana, Y. Kawahata, H. Isono and N. Mitamura, "40-Gbitls WDM Automatic Dispersion Compensation with Virtually Imaged Phased Array (VIPA) Variable Dispersion Compensators", IEICE TRANS. COMMUN., VOL. E85-B, NO. 2, pp. 463-469, 2002). Further, there has also been proposed a two-photon absorption system for receiving a main signal light utilizing a two-photon absorbing device which absorbs simultaneously two photons, to detect the residual dispersion based on an output from the two-photon absorbing device (refer to literature 3; C. Tian and S. Kinoshita, "Polarization-lndependent Waveform Monitoring with Two-Photon Absorption in Si-APD in High-Speed Transmission Systems", ECOC 2004 We4.P.070).

However, the conventional chromatic dispersion monitoring technologies as described above cause problems as follows.

Namely, in the above error monitoring system, since it is necessary to arrange a chromatic dispersion monitor on the reception end of the main signal light, it is difficult to apply the error monitoring system to an in-line halfway along an optical fiber transmission path. Further, there is a problem in that it is hard to distinguish the chromatic dispersion from other variation factors, for example, an optical signal to noise ratio (OSNR), the polarization mode dispersion (PMD) or the like.

In the clock monitoring system, there is a problem in that since it is necessary to use a high frequency device for a light receiving element or a clock amplifier, a high cost cannot be avoided.

In the two-photon absorption system, there is a problem in that the realization of device is not easy in view of the reliability, the polarization dependence and the like, and also it is hard to ensure the sufficient monitoring sensitivity.

SUMMARY OF THE INVENTION

The present invention has been accomplished in view of the above problems and has an object to provide a chromatic dispersion monitoring method and a chromatic dispersion monitoring apparatus, capable to be arranged on an in-line and capable to be easily realized at a low cost, and an optical transmission system.

In order to achieve the above object, the present invention provides a chromatic dispersion monitoring method for monitoring the chromatic dispersion of optical signal, comprising: receiving an optical signal to convert it into an electrical signal and also limiting a frequency bandwidth of the electrical signal to be within a range which is lower than a frequency corresponding to a bit rate of the optical signal and also is higher than a minimum frequency set according to a modulation format of the optical signal and the bit rate thereof; eliminating a direct current component of the electrical signal; detecting the power of the electrical signal whose direct current component is eliminated; and detecting the residual dispersion of the optical signal based on the detected power.

Further, the present invention provides a chromatic dispersion monitoring apparatus for monitoring the residual dispersion of optical signal, comprising: a bandwidth limiting section that receives an optical signal to convert it into an electrical signal and also limits a frequency bandwidth of the electrical signal to be within a range which is lower than a frequency corresponding to a bit rate of the optical signal and also is higher than a minimum frequency set according to a modulation format of the optical signal and the bit rate thereof; a direct current eliminating section that eliminates a direct current component of the electrical signal output from the bandwidth limiting section; and a power detecting section that detects the power of the electrical signal output from the direct current eliminating section and detects the residual dispersion of the optical signal based on the detected power.

In the chromatic dispersion monitoring method and the chromatic dispersion monitoring apparatus as described the above, the bandwidth limiting is performed according to the modulation format of the optical signal and the bit rate thereof, and also the power of the electrical signal whose direct current component is eliminated is detected, so that the chromatic dispersion of the optical signal is monitored based on the detection result.

Further, as a specific configuration of the chromatic dispersion monitoring method and the chromatic dispersion monitoring apparatus described the above, the modulation format of the optical signal is a modulation format in which the power of the electrical signal can reach a maximal or minimal value when the residual dispersion of the optical signal is zero. The minimum frequency may be set at a lower limit value of a frequency capable of detecting the maximal or minimal value, and also may be set to be in proportion to the approximately 1.5-th power of the bit rate of the optical signal. In such a configuration, the residual dispersion of the optical signal is monitored using the maximal or minimal value of the power of the electrical signal, at which the residual dispersion becomes zero, as a reference.

The present invention provides an optical transmission system provided with functions of transmitting an optical signal transmitted from an optical sender to an optical receiver via an optical fiber transmission path and also of compensating for the residual dispersion of optical signal occurred due to the transmission, comprising: variable dispersion compensators, each of which is arranged on the optical fiber transmission path, and imparts the variable chromatic dispersion to the optical signal being propagated through the optical fiber transmission path to perform the chromatic dispersion compensation; optical branching couplers, each of which branches a part of the optical signal output from the variable dispersion compensator as a monitor light; the above described chromatic dispersion monitoring apparatuses, each for monitoring the residual dispersion which remains in the optical signal output from the variable dispersion compensator; and control circuits, each of which feedback controls a compensation amount of the chromatic dispersion in the variable dispersion compensator based on the monitoring result by the chromatic dispersion monitoring apparatus.

In the optical transmission system as described above, the compensation amount of the chromatic dispersion in the variable dispersion compensator arranged on the optical fiber transmission path is feedback controlled based on the monitoring result by the above described chromatic dispersion monitoring apparatus, so that the automatic dispersion compensation of the optical signal being propagated through the optical fiber transmission path is performed.

According to the chromatic dispersion monitoring method and the chromatic dispersion monitoring apparatus of the present invention as described above, it is possible to monitor the chromatic dispersion not only at a reception end but also at an arbitrary position of an in-line, and also it is possible to monitor the chromatic dispersion of a high-speed optical signal utilizing a low-speed device of relative low cost and of excellent reliability.

Further, according to the optical transmission system of the present invention, it becomes possible to easily realize the automatic chromatic dispersion at a desired position of the in-line as well as the reception end, by feedback controlling the variable dispersion compensator based on the monitoring result by the chromatic dispersion monitoring apparatus as described above.

The other objects, features and advantages of the present invention will be apparent from the following description of the embodiments with reference to the accompanying drawings.

DETAILED DESCRIPTION OF THE INVENTION

Hereinafter, an embodiment of the present invention will be described with reference to drawings.

Figure 1:
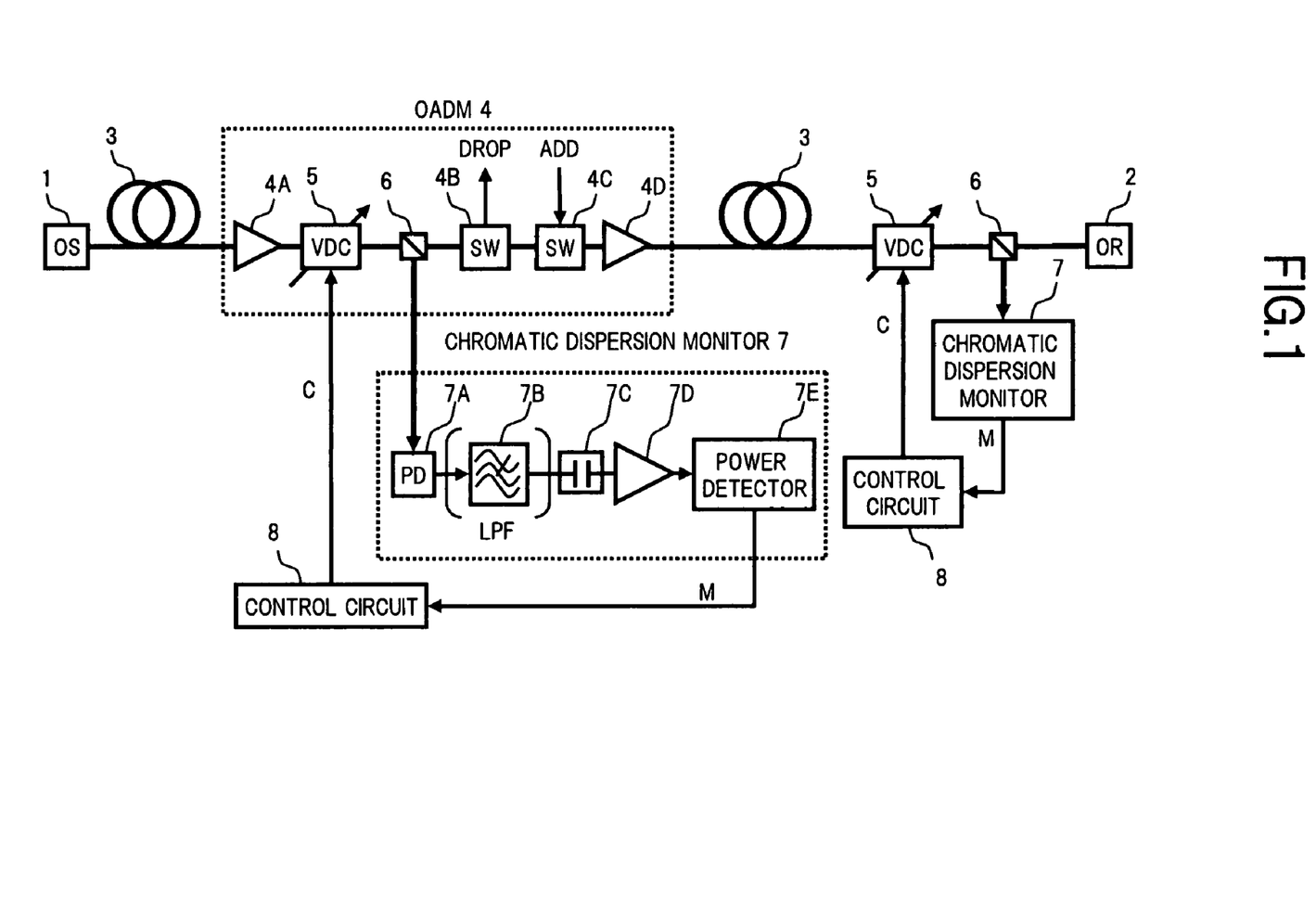
FIG. 1 is a block diagram showing a configuration of one embodiment of an optical transmission system to which a chromatic dispersion monitoring technology according to the present invention is applied.

FIG. 1 is a block diagram showing a configuration of one embodiment of an optical transmission system according to the present invention.

In FIG. 1, in the optical transmission system in the present embodiment having a configuration in which an optical sender (OS) 1 and an optical receiver (OR) 2 are connected to each other via an optical fiber transmission path 3 and an optical add/drop multiplexing (OADM) device 4 is disposed on the optical fiber transmission path 3, a variable dispersion compensator (VDC) 5 for automatically compensating for the chromatic dispersion, an optical branching coupler 6, a chromatic dispersion monitor 7 and a control circuit 8 are disposed, so as to correspond to each of the optical add/drop multiplexing device 4 and the optical receiver 2.

The optical sender 1 is for transmitting, to the optical fiber transmission fiber 3, a wavelength division multiplexed (WDM) light in which a plurality of optical signals of different wavelengths are multiplexed. Further, the optical receiver 2 is for receiving to process the WDM light transmitted from the optical sender 1 via the optical fiber transmission path 3 and the optical add/drop multiplexing device 4. The optical sender 1, the optical receiver 2 and the optical fiber transmission path 3 each has a configuration same as the known configuration used for a typical optical transmission system.

The optical add/drop multiplexing device 4 comprises, here for example: an input side optical amplifier 4A which collectively amplifies the WDM light input from the optical fiber transmission path 3; an optical switch (SW) 4B which drops an optical signal of desired wavelength from the amplified WDM light; an optical switch (SW) 4C which adds an optical signal of desired wavelength to the WDM light which passed through the optical switch 4B; and an output side optical amplifier 4D which collectively amplifies the WDM light output from the optical switch 4C. Further, the optical add/drop multiplexing device 4 includes the variable dispersion compensator 5 capable of imparting the variable chromatic dispersion to the WDM light and the optical branching coupler 6 which branches a part of the WDM light output from the variable dispersion compensator 5 as a monitor light. The monitor light branched by the optical branching coupler 6 is given to the chromatic dispersion monitor 7 so that the residual chromatic dispersion is monitored, and based on the monitoring result, a compensation amount of the chromatic dispersion in the variable dispersion compensator 5 is feedback controlled by the control circuit 8. Incidentally, also on an input stage of the optical receiver 2, the variable dispersion compensator 5, the optical branching coupler 6, the chromatic dispersion monitor 7 and the control circuit 8, each of which has the configuration same as that described above, are disposed.

As a specific configuration of the variable dispersion compensator 5, it is preferable to use, for example, a configuration utilizing a virtually imaged phased array (VIPA) (refer to the literature 2). However, the configuration of the variable dispersion compensator 5 is not limited to the above specific example, and it is possible to implement the present invention using a variable dispersion compensator of known configuration.

The chromatic dispersion monitor 7 includes, for example; a photodetector (PD) 7a, a low-pass filter (LPF) 7B, a DC elimination circuit 7C, an electric amplifier 7D, and a power detector 7E. The photodetector 7A is for receiving the monitor light from the optical branching coupler 6 to convert it into an electrical signal, and a typical light receiving element is used as the photodetector 7A. The low-pass filter 7B extracts a low frequency component from the electrical signal output from the photodetector 7A, to output it to the DC elimination circuit 7C. A cut-off frequency in the low-pass filter 7B, as described later in detail, is set according to a modulation format of each optical signal contained in the WDM light and a bit rate thereof. Incidentally, here, there is shown the configuration example in which the low frequency component of the electrical signal is extracted using the low-pass filter 7B. However, it is possible to omit the low-pass filter 7B by using the photodetector 7A of low-speed having a response speed equivalent to the above cut-off frequency. The DC elimination circuit 7C is for eliminating a direct current component contained in the electrical signal of low frequency, which is extracted by the low-pass filter 7B, using a capacitor or the like. The electric amplifier 7D amplifies the electrical signal passed through the DC elimination circuit 7C by a predetermined gain. The power detector 7E detects the power of an output signal from the electric amplifier 7D, to output a signal M indicating the detection result to the control circuit 8.

Incidentally, in the present embodiment, the photodetector 7A and the low-pass filter 7B function together as a bandwidth limiting section, the DC elimination circuit 7C functions as a direct current eliminating section, and the electric amplifier 7D and the power detector 7E function together as a power detecting section.

Figure 2:
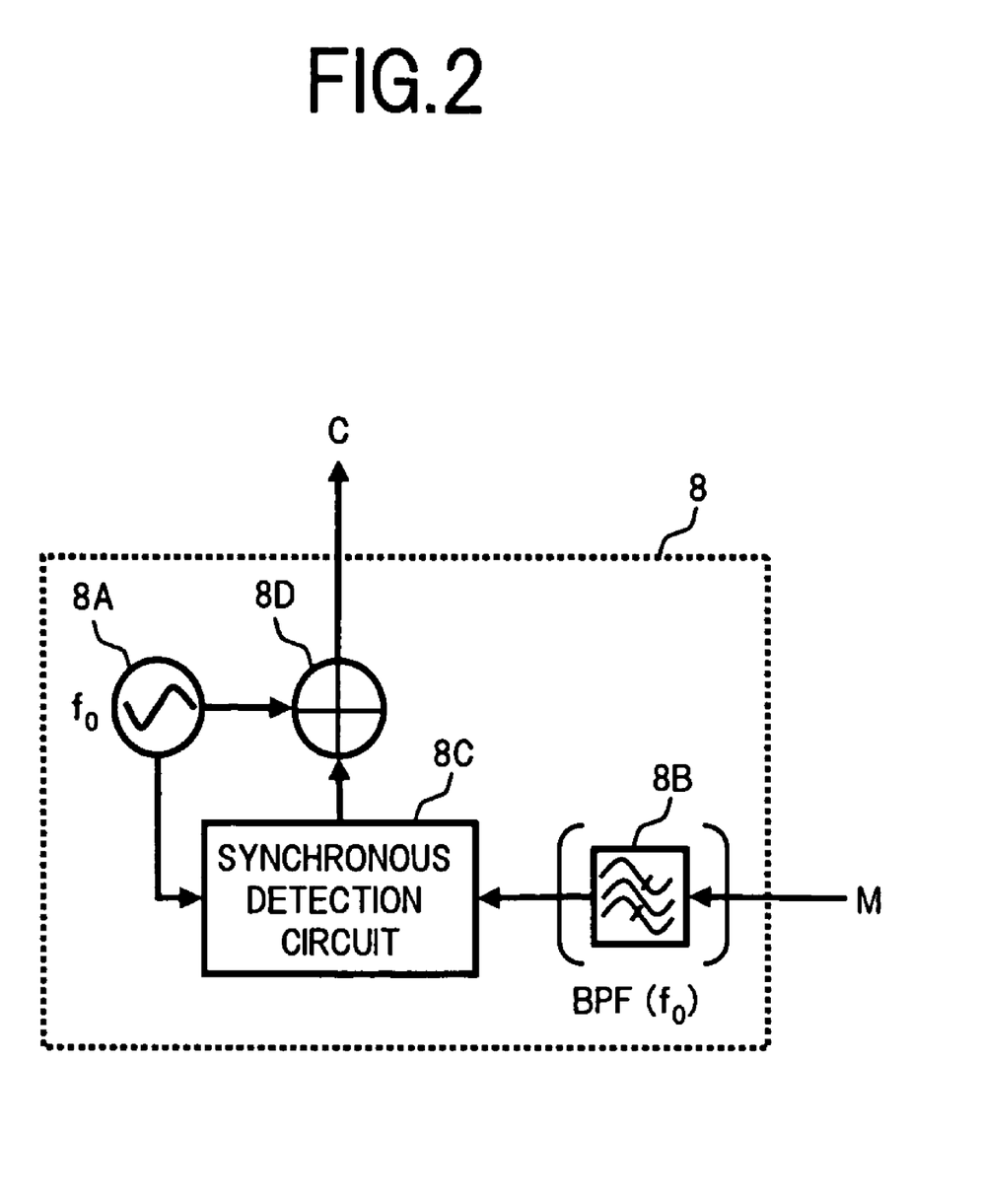
FIG. 2 is a diagram showing a specific configuration example of a control circuit in the embodiment.

As shown in FIG. 2 for example, the control circuit 8 includes a low frequency oscillator 8A, a band-pass filter (BPF) 8B, a synchronous detection circuit 8C and a superposed circuit 8D. The low frequency oscillator 8A generates an electrical signal of frequency $f_0$ to output it to the synchronous detection circuit 8C and to the superposed circuit 8D. The band-pass filter 8B extracts a frequency $f_0$ component from the signal M output from the power detector 7E of the chromatic dispersion monitor 7, to output it to the synchronous detection circuit 8C. However, it is also possible to omit the band-pass filter 8B. The synchronous detection circuit 8C performs the synchronous detection on an output signal from the low frequency oscillator 8A and on the monitor signal passed through the band-pass filter 8B. The superposed circuit 8D superposes the respective output signals from the low frequency oscillator 8A and from the synchronous detection circuit 8C, to generate a control signal C to be given to the variable dispersion compensator 5.

Here, there will be described in detail an operation principle of the chromatic dispersion monitor 7.

In the chromatic dispersion monitor 7 of the above configuration, a part of the WDM light, which is branched by the optical branching coupler 6 as the monitor light after the WDM light is propagated through the optical fiber transmission path 3, is converted into the electrical signal by the photodetector 7A, and the photo-electrically converted monitor signal is subjected to the bandwidth limitation by the low-pass filter 7B and further, the direct current component thereof is eliminated by the DC elimination circuit 7C. Then, the monitor signal which was subjected to the bandwidth limitation and to the DC cut, is amplified by the electric amplifier 7D and thereafter, the power thereof is detected by the power detector 7E. As a result, the signal M indicating the power variation of the bandwidth limited low frequency monitor signal relative to a reference level (0V) is output from the power detector 7E.

Figure 3:
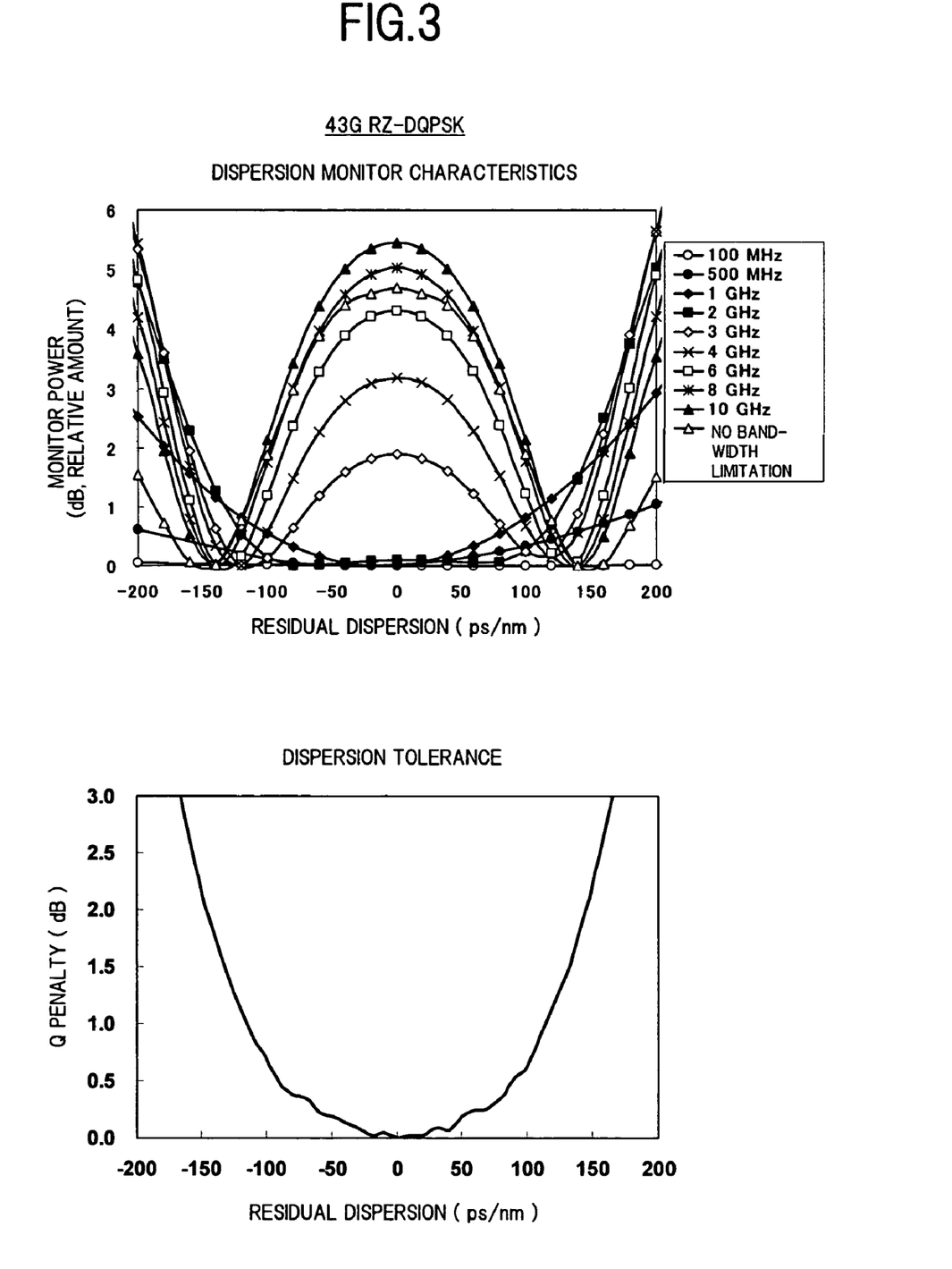
FIG. 3 shows graphs of simulation results of dispersion monitor characteristics and dispersion tolerance in a chromatic dispersion monitor in the embodiment, for a RZ-DQPSK mode of 43 Gbit/s.
Figure 4:
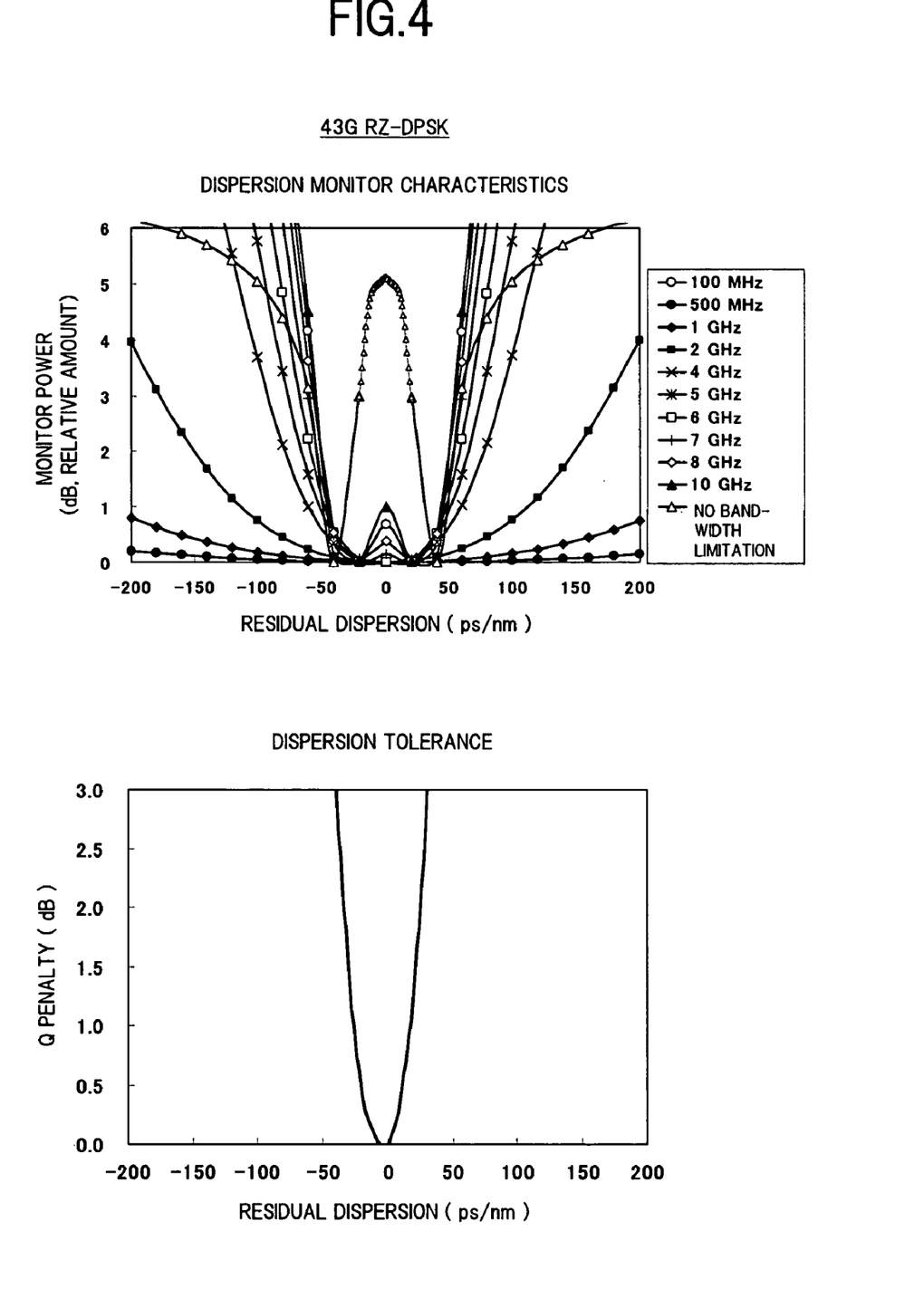
FIG. 4 shows graphs of simulation results of dispersion monitor characteristics and dispersion tolerance in the chromatic dispersion monitor in the embodiment, for a RZ-DPSK mode of 43 Gbit/s.
Figure 5:
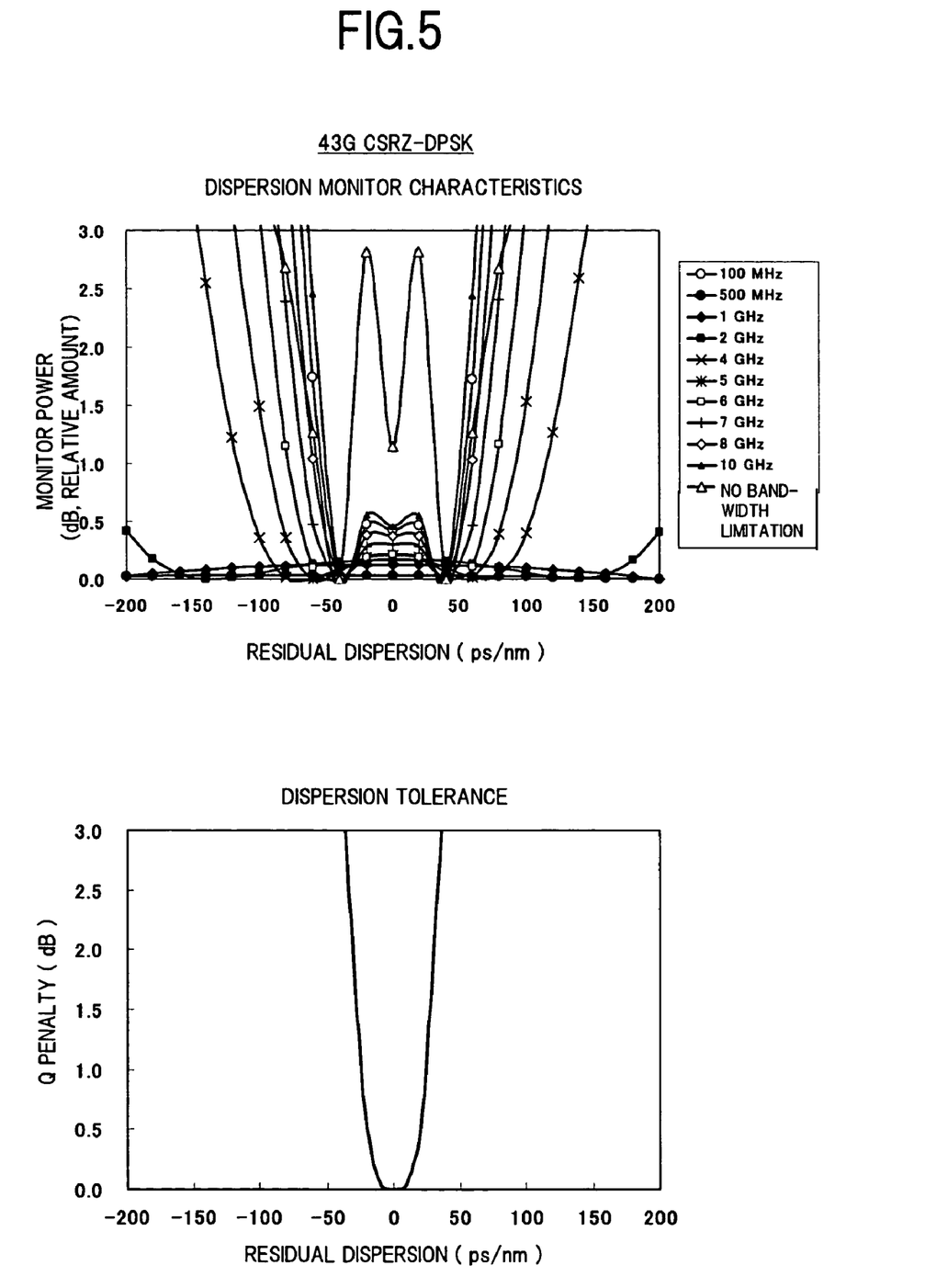
FIG. 5 shows graphs of simulation results of dispersion monitor characteristics and dispersion tolerance in the chromatic dispersion monitor in the embodiment, for a CSRZ-DPSK mode of 43 Gbit/s.
Figure 6:
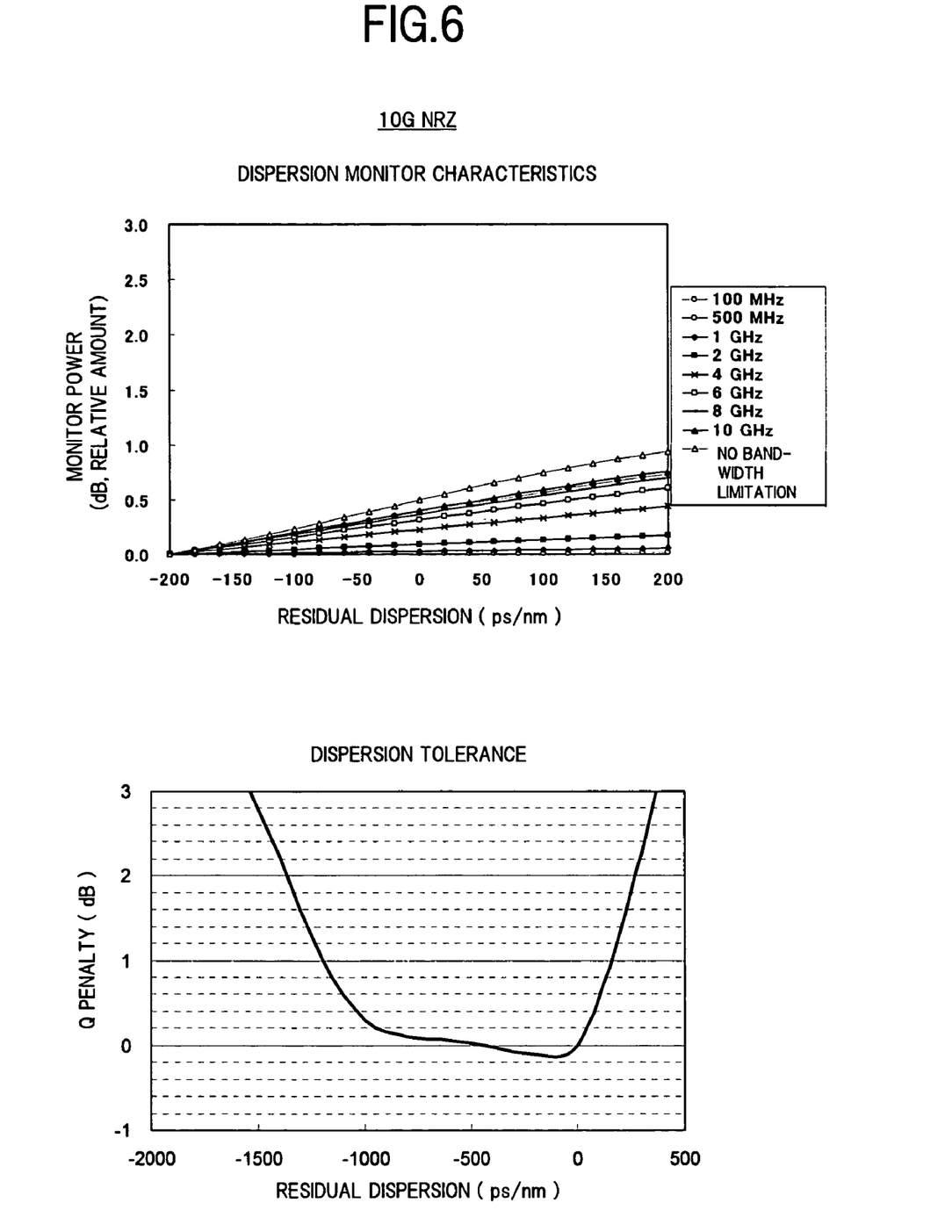
FIG. 6 shows graphs of simulation results of dispersion monitor characteristics and dispersion tolerance in the chromatic dispersion monitor in the embodiment, for a NRZ mode of 10 Gbit/s.

FIG. 3 to FIG. 6 each shows graphs of a simulation result (upper stage) of dispersion monitor characteristics in the chromatic dispersion monitor 7 by changing the frequency of the monitor signal and of a simulation result (lower stage) of dispersion tolerance in the chromatic dispersion monitor 7. FIG. 3 shows the case where the modulation format of main signal light is a RZ (Return to Zero)-DQPSK (Differential Quadrature Phase-Shift Keying) mode of 43 Gbit/s, FIG. 4 shows the case where the modulation format is a RZ-DPSK (Differential Phase Shift Keying) mode of 43 Gbit/s, FIG. 5 shows the case where the modulation format is a CSRZ (Carrier Suppressed Return to Zero) mode of 43 Gbit/s, and FIG. 6 shows the case where the modulation format is a NRZ mode of 10 Gbit/s.

It is understood from the simulation results of dispersion monitor characteristics respectively shown in the upper stages of respective figures that, in the case where the modulation format of main signal light is one of the RZ-DQPSK mode, the RZ-DPSK mode and the CSRZ-DPSK mode, by ensuring the bandwidth (frequency of the monitor signal) of the chromatic dispersion monitor 7 by a required value or more, the monitor power reaches a maximal or minimal value when the residual dispersion is zero. To be specific, in the case of the RZ-DQPSK mode in FIG. 3, by ensuring the bandwidth of approximately 3 GHz or more, the monitor power for when the residual dispersion is zero reaches the maximum. Further, in the case of RZ-DPSK mode in FIG. 4, by ensuring the bandwidth of approximately 6 GHz or more, the monitor power for when the residual dispersion is zero reaches the maximum. Moreover, in the case of the CSRZ-DPSK mode in FIG. 5, by ensuring the bandwidth of approximately 8 GHz or more, the monitor power for when the residual dispersion is zero reaches the minimum. On the other hand, in the case of the NRZ mode in FIG. 6, it is understood that since the monitor power has a characteristic to be simply increased in proportion to the residual dispersion, the monitor power does not reach the maximal or minimal value when the residual dispersion is zero.

In the above described conventional clock monitoring system and the two-photon absorption system, by utilizing the characteristic in which the peak power of optical waveform becomes higher as the residual dispersion becomes less, the chromatic dispersion is monitored based on the power of clock signal or the like having a frequency corresponding to the bit rate of the main signal light, that is, the power of the monitor signal of high frequency, which is not subjected to the bandwidth limitation. Contrary to these conventional systems, the simulation results in the RZ-DQPSK mode, the RZ-DPSK mode and the CSRZ-DPSK mode shown in FIG. 3 to FIG. 5 each indicates that maximal or minimal value information of the monitor power for when the residual dispersion is zero remains even in the monitor signal which is subjected to the bandwidth limitation provided that the required frequency or more corresponding to the modulation format is ensured. Namely, according to the present chromatic dispersion monitor 7, in the cases of RZ-DQPSK mode and the RZ-DPSK mode, it becomes possible to utilize the characteristic in which when the residual dispersion becomes less to approach zero, the monitor power is increased, to judge the state where the residual dispersion is zero, and also, it becomes possible to previously acquire the dispersion monitor characteristics as shown in FIG. 3 and FIG. 4, to obtain a specific value of the residual dispersion based on the monitor power. Further, in the case of the CSRZ-DPSK mode, it becomes possible to utilize the characteristic in which when the residual dispersion becomes less to approach zero, the monitor power is decreased, to judge the state where the residual dispersion is zero, and also, it becomes possible to previously acquire the dispersion monitor characteristics as shown in FIG. 5 using a technology of pattern recognition or the like, to obtain the specific value of the residual dispersion based on the monitor power.

Incidentally, although not shown particularly in the figure, it is possible to judge that the present invention is effective for a CSRZ-DQPSK mode based on the simulation results for the RZ-DQPSK mode, the RZ-DPSK mode and the CSRZ-DPSK mode. On the other hand, in the present invention, the chromatic dispersion is monitored based on the above described principle. Therefore, the present invention cannot cope with the modulation format, such as the NRZ mode shown in FIG. 6, in which the monitor power does not reach the maximal or minimal value when the residual dispersion is zero.

Here, there will be additionally made an explanation on the bit rate dependence of the dispersion monitor characteristics in the present chromatic dispersion monitor 7. In the simulations of the dispersion monitor characteristics, results of which are shown in FIG. 3 to FIG. 5, the bit rate of the main signal light is fixed at 43 Gbit/s. However, if the bit rate is changed, the dispersion monitor characteristics are also changed. FIG. 7 to FIG. 10 show simulation results for when the bit rate is 21.5 Gbit/s, 43 Gbit/s, 86 Gbit/s and 172 Gbit/s, in the RZ-DQPSK mode for example.

Figure 7:
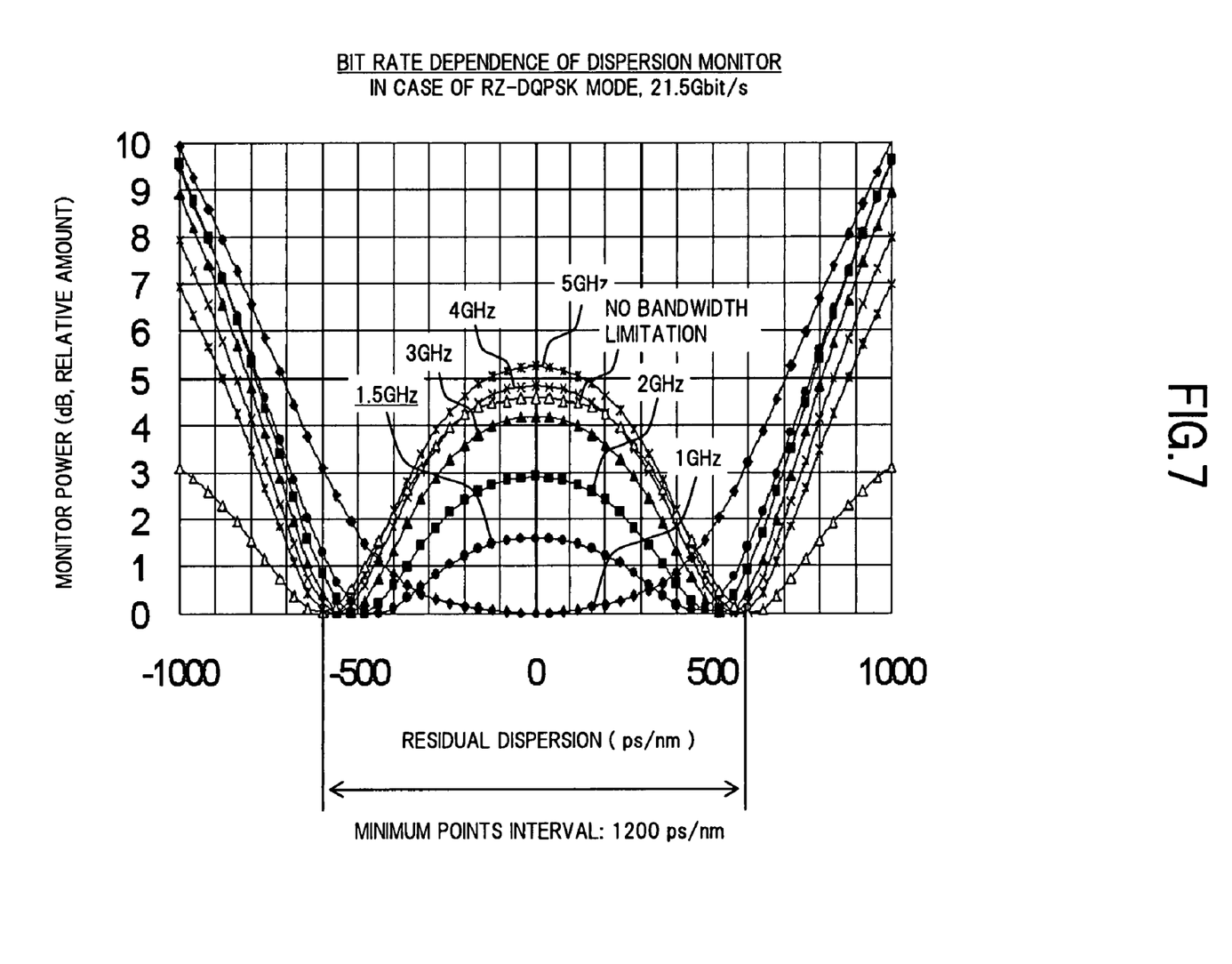
FIG. 7 is a graph showing a simulation result of dispersion monitor characteristics in the chromatic dispersion monitor in the embodiment, for a RZ-DQPSK mode of 21.5 Gbit/s.
Figure 8:
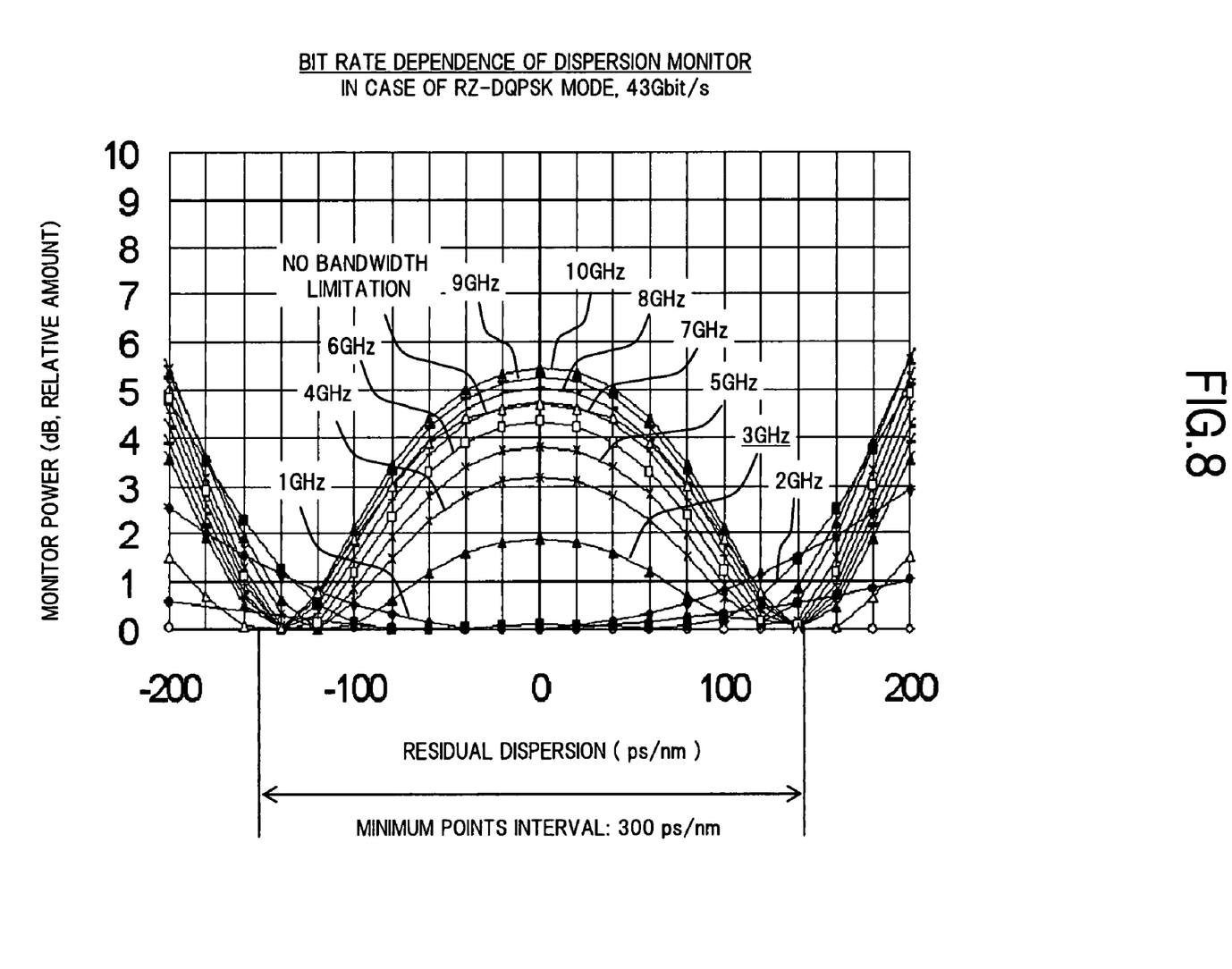
FIG. 8 is a graph showing a simulation result of dispersion monitor characteristics in the chromatic dispersion monitor in the embodiment, for a RZ-DQPSK mode of 43 Gbit/s.
Figure 9:
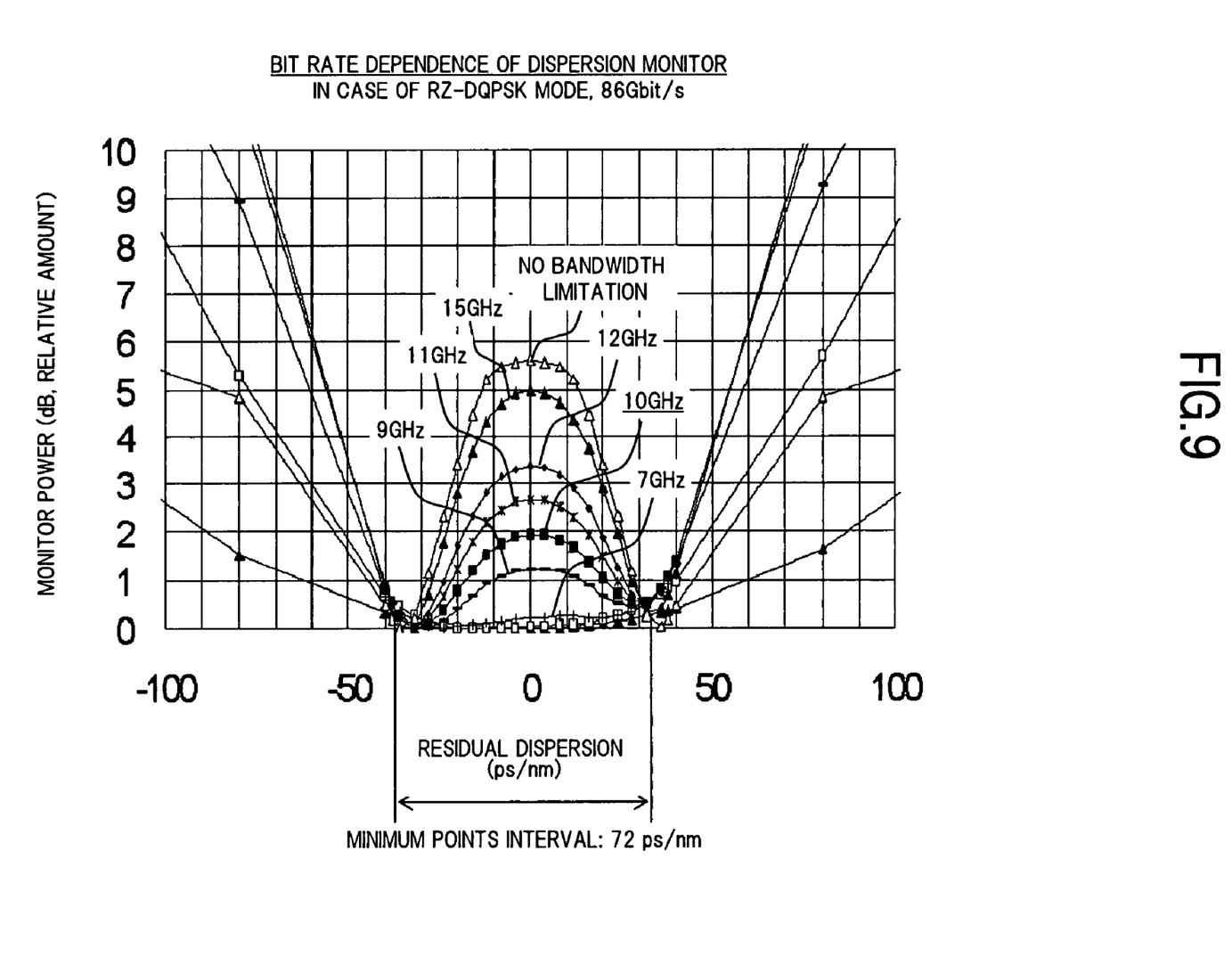
FIG. 9 is a graph showing a simulation result of dispersion monitor characteristics in the chromatic dispersion monitor in the embodiment, for a RZ-DQPSK mode of 86 Gbit/s.
Figure 10:
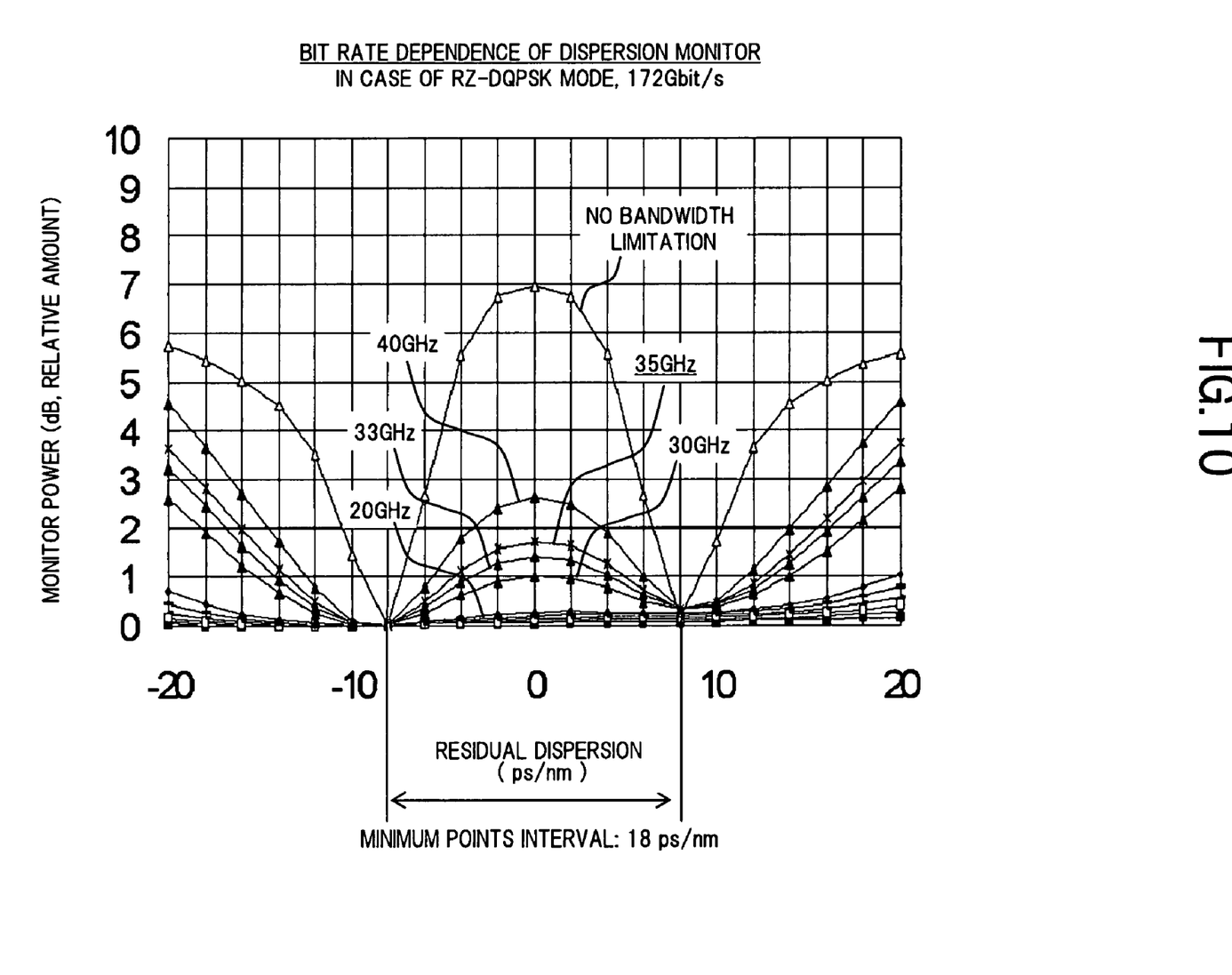
FIG. 10 is a graph showing a simulation result of dispersion monitor characteristics in the chromatic dispersion monitor in the embodiment, for a RZ-DQPSK mode of 172 Gbit/s.

Reviewing specifically the dispersion monitor characteristics in the respective figures, in the case of 21.5 Gbit/s in FIG. 7, if attention is given to, for example, a state where the maximum value of the monitor power reaches about 2 dB as the feature of the peak shape of the monitor power for when the residual dispersion is zero, the bandwidth of the chromatic dispersion monitor 7 at that time is 1.5 GHz. Further, if attention is given to an interval between two points at each of which the monitor power reaches the minimum value, as the feature relating to the monitoring width of the chromatic dispersion, the interval between the minimum points in the case of no bandwidth limitation is about 1200 ps/nm. Contrary to this, in the case of 43 Gbit/s in FIG. 8, the bandwidth for when the maximum value of the monitor power reaches about 2 dB is 3 GHz, and the interval between the minimum points is about 300 ps/nm. In the case of 86 Gbit/s in FIG. 9, the bandwidth for when the maximum value of the monitor power reaches about 2 dB is 10 GHz, and the interval between the minimum points is about 72 ps/nm. Further, in the case of 172 Gbit/s in FIG. 10, the bandwidth for when the maximum value of the monitor power reaches about 2 dB is 35 GHz, and the interval between the minimum points is about 18 ps/nm.

Figure 11:
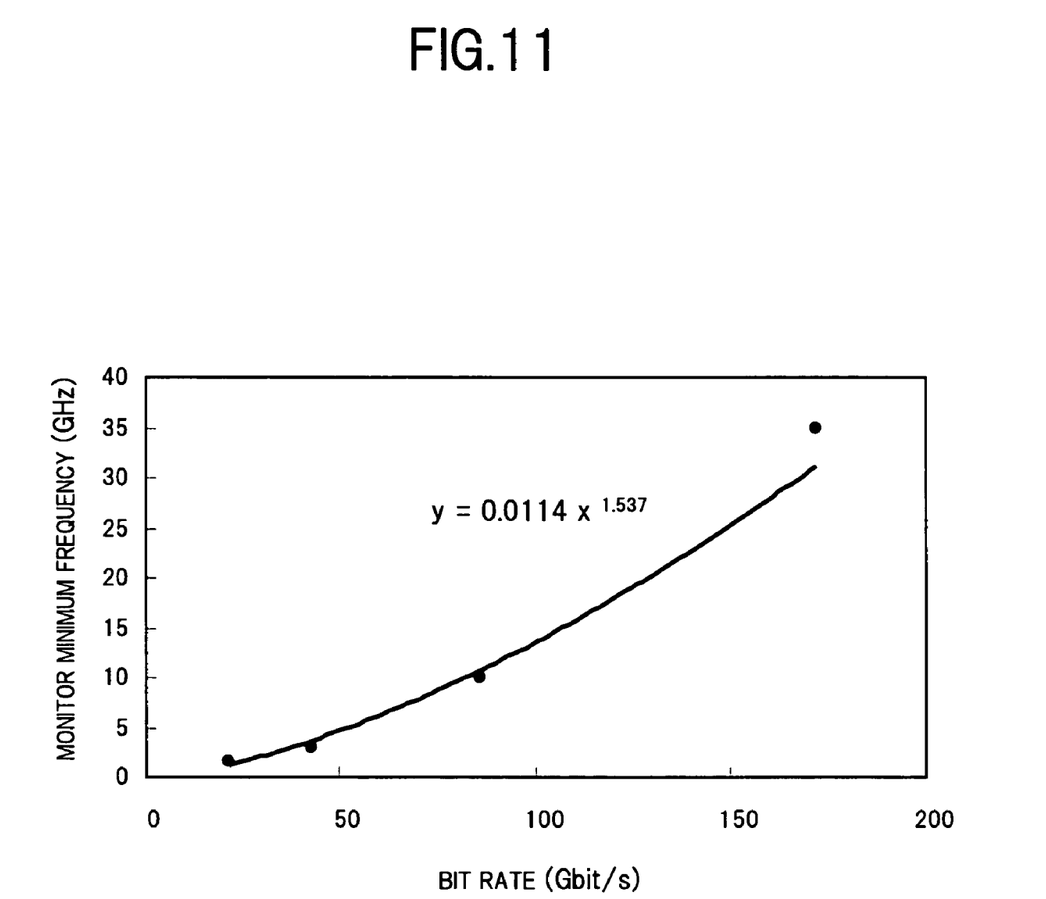
FIG. 11 is a graph showing a relationship between a monitor minimum frequency and a bit rate in the embodiment.
Figure 12:
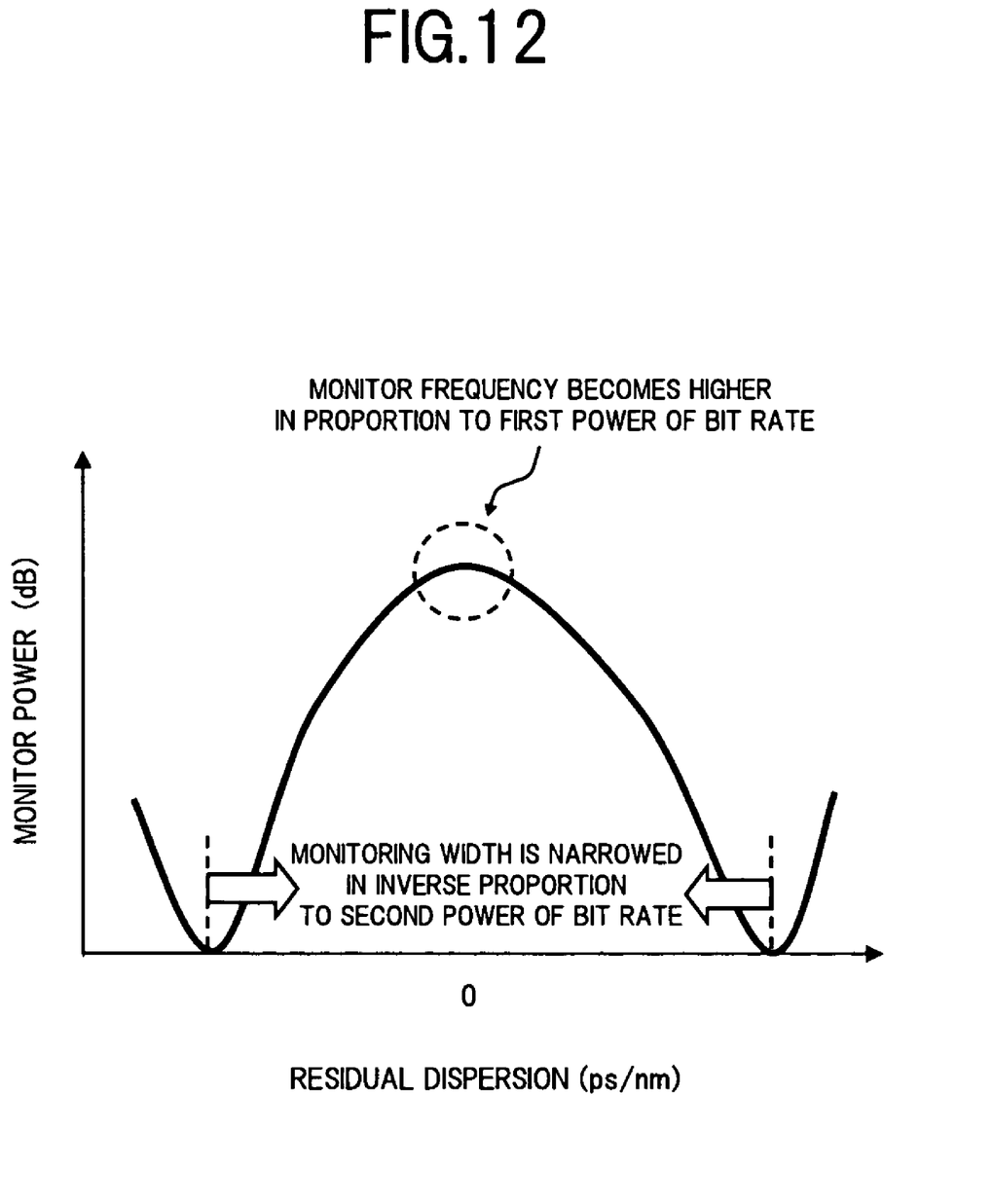
FIG. 12 is a graph for explaining the bit rate dependence of the monitor minimum frequency in the embodiment.

Based on the above simulation results, as shown in FIG. 11 for example, if the above values are plotted provided that the x-axis is the bit rate and the y-axis is the minimum frequency of the monitor signal (the bandwidth of the chromatic dispersion monitor 7), a relationship in which the minimum frequency of the monitor signal is in proportion to the approximately 1.5-th power of the bit rate is obtained. For this bit rate dependence, as shown in a conceptual diagram of FIG. 12, it is considered that the above multiplier factor (the approximately 1.5-th power) is determined by a multiplier effect of: (i) the frequency of the monitor signal becomes higher in proportion to the 1st power of the bit rate relating to the peak of the monitor power for when the residual dispersion is zero; and (ii) the monitoring width (the interval between the minimum points) of the chromatic dispersion is narrowed in inverse proportion to the 2nd power of the bit rate.

As described above, the present chromatic dispersion monitor 7 is effective for the main signal light in the modulation format in which the monitor power reaches the maximal or minimal value when the residual dispersion is zero, to be specific, the RZ-DQPSK mode, the CSRZ-DQPSK mode, the RZ-DPSK mode, the CSRZ-DPSK mode and the like, and also has a characteristic in which the bandwidth limitation of the monitor signal is performed in the range capable of detecting the maximal or minimal value of the monitor power and a lower limit value (the minimum frequency of the monitor signal) of the bandwidth indicates the dependence which is in proportion to the approximately 1.5-th power of the bit rate of the main signal light.

Next, there will be described an operation of the automatic dispersion compensation which is realized by using the above described chromatic dispersion monitor 7. Here, the explanation is made, assuming the cases as shown in FIG. 3 and FIG. 4 where the monitor power reaches the maximum when the residual dispersion is zero.

In the present optical transmission system, the WDM light transmitted from the optical sender 1 is input to the optical add/drop multiplexing device 4 via the optical fiber transmission path 3. In the optical add/drop multiplexing device 4, the WDM light from the optical fiber transmission path 3 is collectively amplified by the input side optical amplifier 4A, and thereafter, is given to the variable dispersion compensator 5 so that the automatic compensation is performed on the chromatic dispersion of the WDM light. This automatic dispersion compensation is performed such that a part of the WDM light output from the variable dispersion compensator 5 is branched by the optical branching coupler 6 as the monitor light, and the chromatic dispersion monitor 7 monitors the residual dispersion using the monitor light, and based on the monitoring result, the control circuit 8 feedback controls the compensation amount of the chromatic dispersion in the variable dispersion compensator 5.

To be specific, in the chromatic dispersion monitor 7, in accordance with the operation principle as described above, after the monitor light from the optical branching coupler 6 is photo-electrically converted by the photodetector 7, the converted monitor signal is given to the low-pass filter 7B so that the low frequency component thereof is extracted, and is further given to the DC elimination circuit 7C so that the direct current component thereof is eliminated. Then, the monitor signal, whose bandwidth is limited to the cut-off frequency of the low-pass filter 7B and also whose direct current component is eliminated, is given to the power detector 7E via the electric amplifier 7D, so that the monitor power, which reaches the maximum when the residual dispersion is zero, is detected, and the signal M indicating the detection result is output to the control circuit 8 from the power detector 7E.

In the control circuit 8, the signal M from the chromatic dispersion monitor 7 is given to the synchronous detection circuit 8C via the band-pass filter 8B, so that the synchronous detection thereof with the oscillation signal of frequency $f_0$ from the low frequency oscillator 8A is performed. Then, the output signal from the synchronous detection circuit 8C is given to the superposed circuit 8D to be superposed on the oscillation signal of frequency $f_0$, so that the control signal C for feedback controlling the variable dispersion compensator 5 is output. As a result, by a typical synchronous detection mode, it becomes possible to track with high accuracy the peak of the monitor power in the chromatic dispersion monitor 7, and also to automatically compensate for the residual dispersion of the WDM light which is output from the variable dispersion compensator 5, to be zero.

However, in order to feedback control the variable dispersion compensator 5 by the control circuit 8 of the synchronous detection mode as described above to make the residual dispersion to be zero, it is necessary to initially set the compensation amount of the variable dispersion compensator 5, so that a residual dispersion value at the initial setting time of the variable dispersion compensator 5 is within a convex shape range in the graph of dispersion monitor characteristics shown in each of the upper stages of FIG. 3 and FIG. 4.

Incidentally, herein, there is shown the one example in which the automatic dispersion compensation is performed so that the residual dispersion becomes zero. However, it is also possible to perform the automatic dispersion compensation so that the residual dispersion becomes a predetermined value other than zero. In this case, the configuration may be such that, for example, a relationship between the monitor power of the chromatic dispersion monitor 7 and the residual dispersion is previously acquired to be stored in the control circuit 8, and the control circuit 8 performs the correction of controlled variable corresponding to a target value of the residual dispersion while referring to this relationship. Further, herein, the control in the synchronous detection mode is performed assuming the case where the monitor power reaches the maximum when the residual dispersion is zero. However, also in the case as shown in FIG. 5 where the monitor power reaches the minimum when the residual dispersion is zero, it is possible to automatically compensate for the residual dispersion to be zero or the predetermined value by utilizing for example the known pattern recognition technology or the like.

The WDM light, which was subjected to the automatic dispersion compensation by the variable dispersion compensator 5 in the optical add/drop multiplexing device 4 in the above manner, passes through the optical branching coupler 6 to be given to the optical switches 4B and 4C so that the optical signal of required wavelength is dropped from the WDM light and the optical signal of required wavelength is added to the WDM light, and thereafter, is collectively amplified by the output side optical amplifier 4C to be output to the optical fiber transmission path 3. Then, for the WDM light having been propagated through the optical fiber transmission path 3, the residual dispersion thereof accumulated up to the reception end is subjected to the automatic compensation in a manner same as the automatic dispersion compensation in the above optical add/drop multiplexing device 4, by the variable dispersion compensator 5, the optical branching coupler 6, the chromatic dispersion monitor 7 and the control circuit 8, which are disposed on the input stage of the optical receiver 2. Since the automatic dispersion compensation at the reception end may be basically performed so that the residual dispersion becomes zero, it is possible to make the residual dispersion of the WDM light received by the optical receiver 2 to be zero, by tracking with high accuracy the peak of the monitor power in the chromatic dispersion monitor 7 by the control circuit 8 of the typical synchronous detection mode as described above to feedback control the variable dispersion compensator 5.

As described above, according to the present embodiment, the method is realized in which the bandwidth limitation is performed according to the modulation format of the main signal light and the bit rate thereof, and also, the power of the monitor signal whose direct current component is eliminated is detected, so that the chromatic dispersion of the main signal light is monitored using the maximal or minimal value of the monitor power as the reference. As a result, it is possible to monitor the chromatic dispersion not only at the reception end but also at the arbitrary position in an in-line halfway along the optical fiber transmission path 3, and also to monitor the residual dispersion of a high-speed optical signal of such as 10 Gbit/s, 40 Gbit/s or the like, by the chromatic dispersion monitor 7 configured using a low-speed device of relatively low cost and of excellent reliability. Moreover, it becomes possible to easily realize the automatic dispersion compensation at a desired position of the in-line as well as the reception end, by feedback controlling the variable dispersion compensator 5 based on the monitoring result by the chromatic dispersion monitor 7 as described above.

What is claimed is:

1. A chromatic dispersion monitoring method for monitoring the chromatic dispersion of an optical signal, comprising:

receiving an optical signal to convert the optical signal into an electrical signal;

extracting a low frequency component from said electrical signal with a cut-off frequency;

eliminating a direct current component of said electrical signal;

detecting the power of said electrical signal whose direct current component is eliminated; and detecting the residual dispersion of said optical signal based on the detected power, wherein said cut-off frequency is within a range which is lower than a frequency corresponding to a bit rate of said optical signal and also is higher than a minimum frequency set according to a modulation format of said optical signal and the bit rate.

2. A chromatic dispersion monitoring method according to claim 1,
wherein the modulation format of said optical signal is a modulation format in which the power of said electrical signal can reach maximal or minimal value when the residual dispersion of said optical signal is zero, and
said minimum frequency is set at a lower limit value of a frequency capable of detecting said maximal or minimal value, and also is in proportion to the approximately 1.5-th power of the bit rate of said optical signal.

3. A chromatic dispersion monitoring method according to claim 2,
wherein the modulation format of said optical signal is one of a RZ-DQPSK mode, a CSRZ-DQPSK mode, a RZ-DPSK mode and a CSRZ-DPSK mode.

4. A chromatic dispersion monitoring method according to claim 3,
wherein the modulation format of said optical signal is the RZ-DQPSK mode, and said minimum frequency is set at about 3 GHz when the bit rate is 43 Gbit/s.

5. A chromatic dispersion monitoring method according to claim 3,
wherein the modulation format of said optical signal is the RZ-DPSK mode, and said minimum frequency is set at about 6 GHz when the bit rate is 43 Gbit/s.

6. A chromatic dispersion monitoring method according to claim 3,
wherein the modulation format of said optical signal is the CSRZ-DPSK mode, and said minimum frequency is set at about 8 GHz when the bit rate is 43 Gbit/s.

7. A chromatic dispersion monitoring apparatus for monitoring the residual dispersion of an optical signal, comprising:
a photo detector that receives an optical signal to convert the optical signal into an electrical signal;
a low-pass filter that extracts a low frequency component from said electrical signal with a cut-off frequency;
a direct current eliminator that eliminates a direct current component of said electrical signal output from said low-pass filter; and
a power detector that detects the power of said electrical signal output from said direct current eliminator and detects the residual dispersion of said optical signal based on the detected power, wherein
said cut-off frequency is within a range which is lower than a frequency corresponding to a bit rate of said optical signal and also is higher than a minimum frequency set according to a modulation format of said optical signal and the bit rate.

8. A chromatic dispersion monitoring apparatus according to claim 7,
wherein the modulation format of said optical signal is a modulation format in which the power of said electrical signal can reach maximal or minimal value when the residual dispersion of said optical signal is zero, and
said minimum frequency is set at a lower limit value of a frequency capable of detecting said maximal or minimal value, and also is in proportion to the approximately 1.5-th power of the bit rate of said optical signal.

9. A chromatic dispersion monitoring apparatus according to claim 8,
wherein the modulation format of said optical signal is one of a RZ-DQPSK mode, a CSRZ-DQPSK mode, a RZ-DPSK mode and a CSRZ-DPSK mode.

10. An optical transmission system provided with functions of transmitting an optical signal transmitted from an optical sender to an optical receiver via an optical fiber transmission path and also of compensating for the residual dispersion of said optical signal, which occurs due to said transmission, comprising:
variable dispersion compensators, each of which is arranged on said optical fiber transmission path, and imparts the variable chromatic dispersion to the optical signal being propagated through said optical fiber transmission path to perform the chromatic dispersion compensation;
optical branching couplers, each of which branches a part of the optical signal output from said variable dispersion compensator as a monitor light;
chromatic dispersion monitoring apparatuses recited in claim 7, each for monitoring the residual dispersion which remains in the optical signal output from said variable dispersion compensator, using the monitor light from said optical branching coupler; and
control circuits, each of which feedback controls a compensation amount of the chromatic dispersion in said variable dispersion compensator based on the monitoring result by said chromatic dispersion monitoring apparatus.

11. An optical transmission system according to claim 10, wherein said control circuit tracks the peak of the monitor power output from said chromatic dispersion monitoring apparatus by a synchronous detection, to feedback control said variable dispersion compensator.

12. An optical transmission system according to claim 10, wherein said variable dispersion compensator is arranged on an optical node disposed halfway along said optical fiber transmission path and on an input stage of said optical receiver.

13. An optical transmission system according to claim 12, wherein said optical node is provided with an optical add/drop multiplexing device.

* * * * *

UNITED STATES PATENT AND TRADEMARK OFFICE
CERTIFICATE OF CORRECTION

| | |
|---|---|
| PATENT NO. | : 7,769,299 B2 |
| APPLICATION NO. | : 11/475046 |
| DATED | : August 3, 2010 |
| INVENTOR(S) | : Hiroki Ooi et al. |

It is certified that error appears in the above-identified patent and that said Letters Patent is hereby corrected as shown below:

Claim 2, Column 11, line 8, after "signal can reach" insert --a--;

Claim 8, Column 12, line 3, after "signal can reach" insert --a--.

Signed and Sealed this

Twenty-third Day of November, 2010

David J. Kappos
*Director of the United States Patent and Trademark Office*